(12) United States Patent
Tsujino et al.

(10) Patent No.: US 6,185,075 B1
(45) Date of Patent: Feb. 6, 2001

(54) ACTUATOR ARM ASSEMBLY FOR A MAGNETIC STORAGE DEVICE

(75) Inventors: Hitoshi Tsujino, Fujisawa (JP); David William Albrecht, San Jose, CA (US); Masahiko Katoh, Fujisawa; Jun Ishikawa, Yokohama, both of (JP)

(73) Assignee: International Business Machines Corporation, Armonk, NY (US)

( * ) Notice: Under 35 U.S.C. 154(b), the term of this patent shall be extended for 0 days.

(21) Appl. No.: 09/132,009

(22) Filed: Aug. 10, 1998

(30) Foreign Application Priority Data

Sep. 25, 1997 (JP) .................................................. 9-259460

(51) Int. Cl.[7] ...................................................... G11B 5/55
(52) U.S. Cl. ...................................... 360/265.7; 360/266.1
(58) Field of Search ................................ 360/104, 106, 360/265.2, 265.6, 265.7, 266.1; 29/603.03, 603.04, 603.06

(56) References Cited

U.S. PATENT DOCUMENTS

| 5,491,598 | * | 2/1996 | Stricklin et al. | 360/106 |
| 5,550,694 | * | 8/1996 | Hyde | 360/104 |
| 5,627,702 | * | 5/1997 | Kelemen et al. | 360/106 |
| 5,654,851 | * | 8/1997 | Tucker et al. | 360/266.1 X |
| 5,666,243 | * | 9/1997 | Brent | 360/106 |
| 5,751,519 | * | 5/1998 | Hata | 360/106 |
| 5,844,754 | * | 12/1998 | Stefansky et al. | 360/266.1 |
| 5,886,858 | * | 3/1999 | Yanagihara | 360/106 |

* cited by examiner

Primary Examiner—William R. Korzuch
(74) Attorney, Agent, or Firm—Douglas R. Millett

(57) ABSTRACT

An actuator arm assembly comprises stacked suspensions, spacers, a pivot, washer and nut. The pivot and washer have hold portions for engagement during assembly to prevent misalignment of the suspensions. The suspensions, spacers, and washer each have alignment apertures for receiving an alignment bolt for maintaining proper alignment of the suspensions.

2 Claims, 6 Drawing Sheets

[Figure 1]
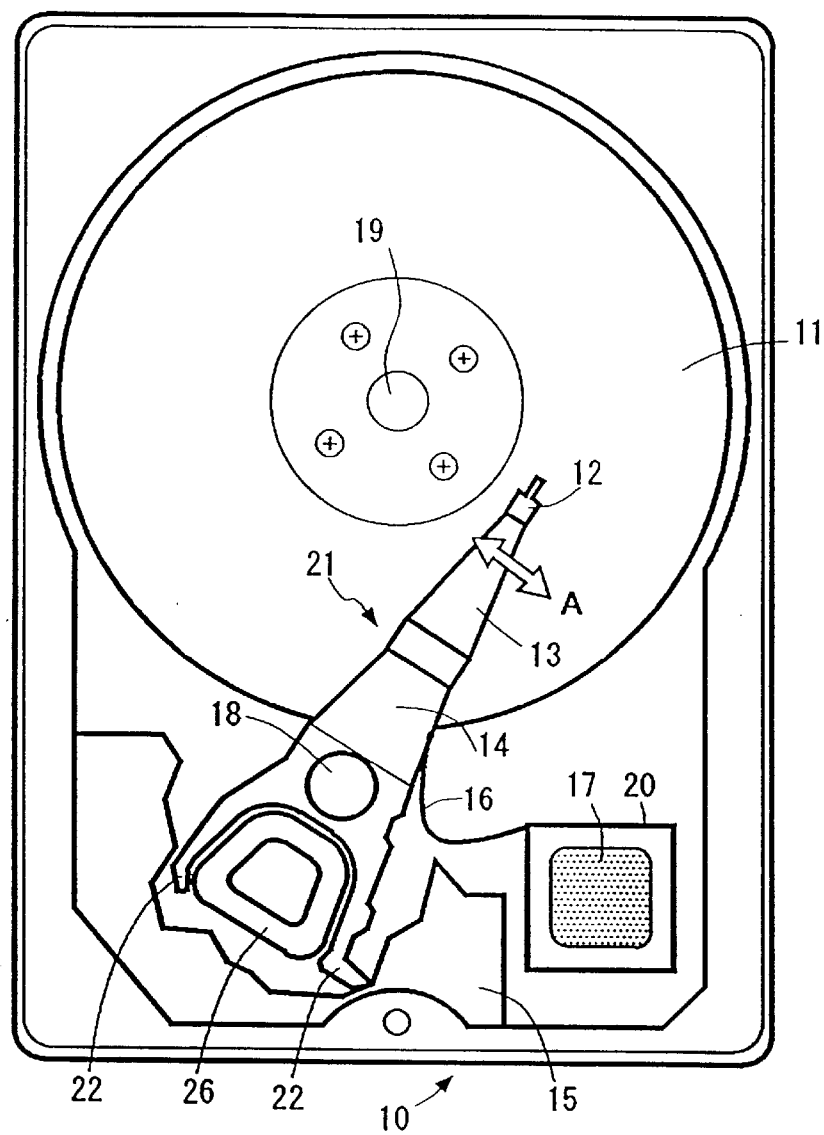
PRIOR ART

[Figure 2]
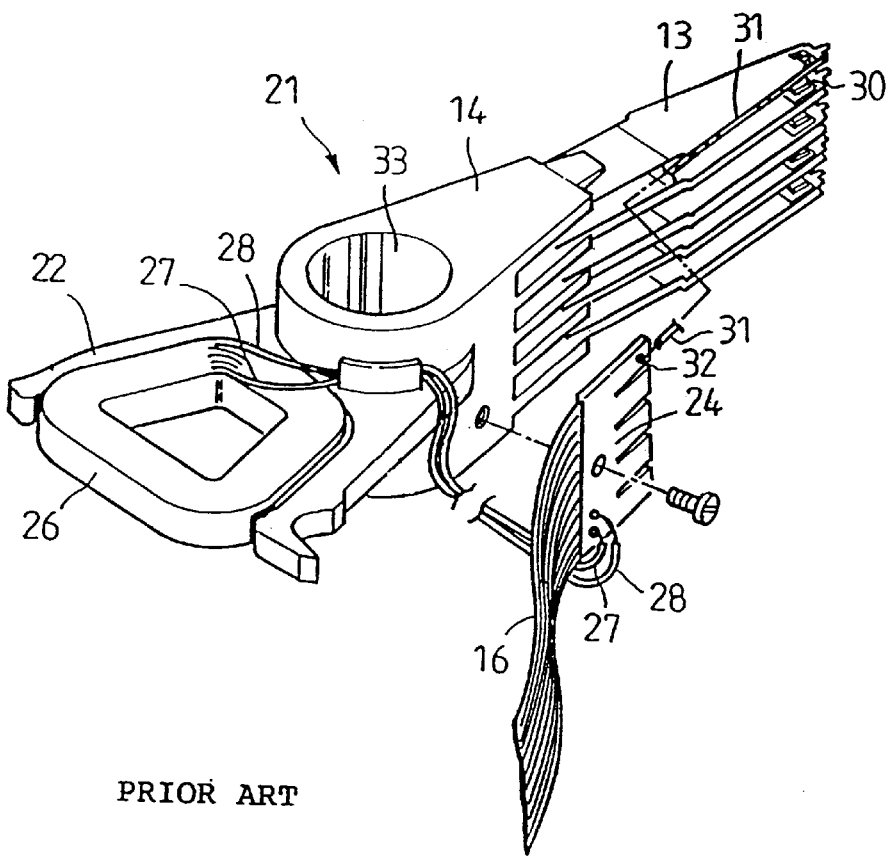
PRIOR ART
[Figure 6]
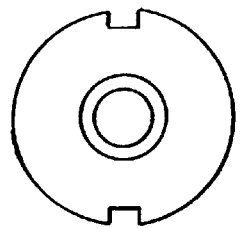

[Figure 3]
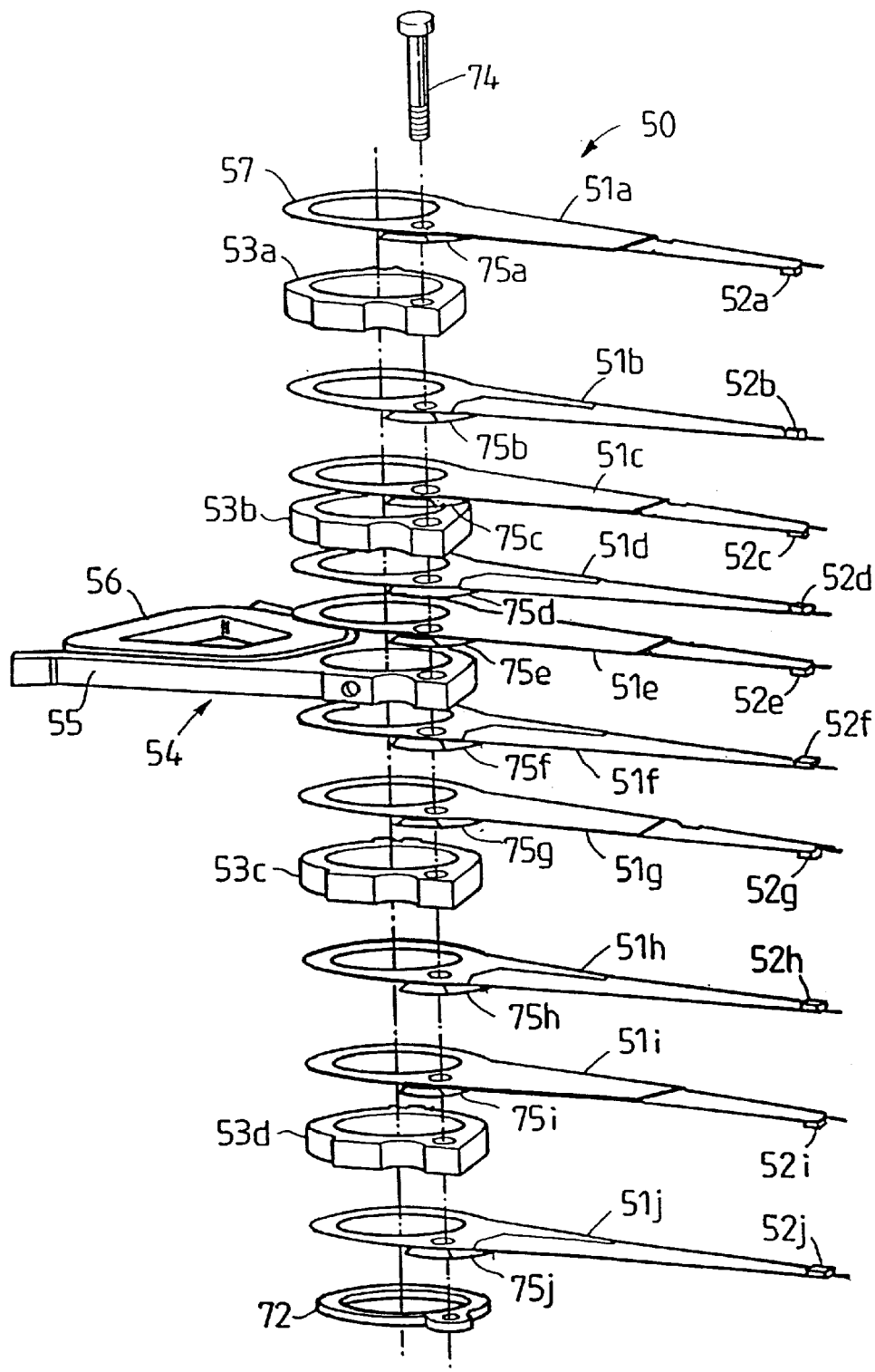

[Figure 4]
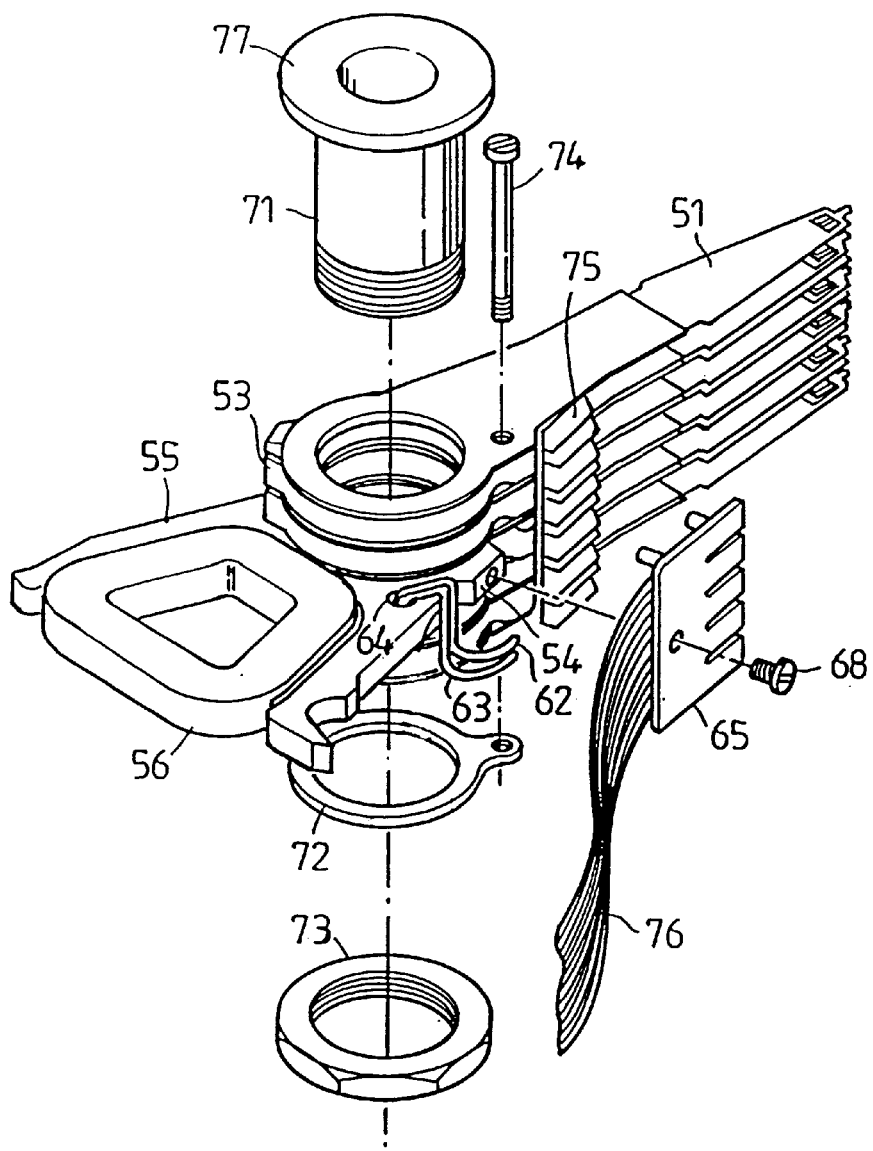

[Figure 5]
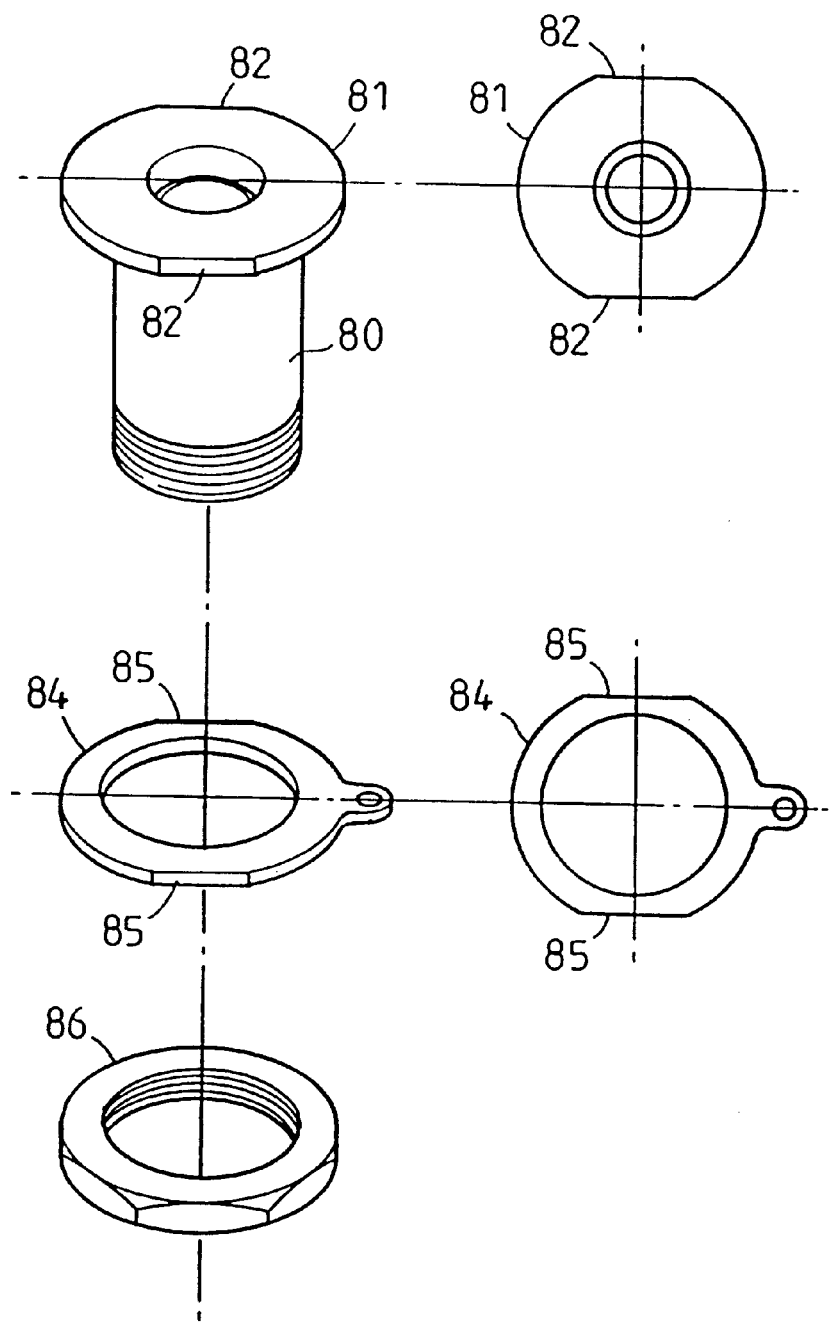

[Figure 7]
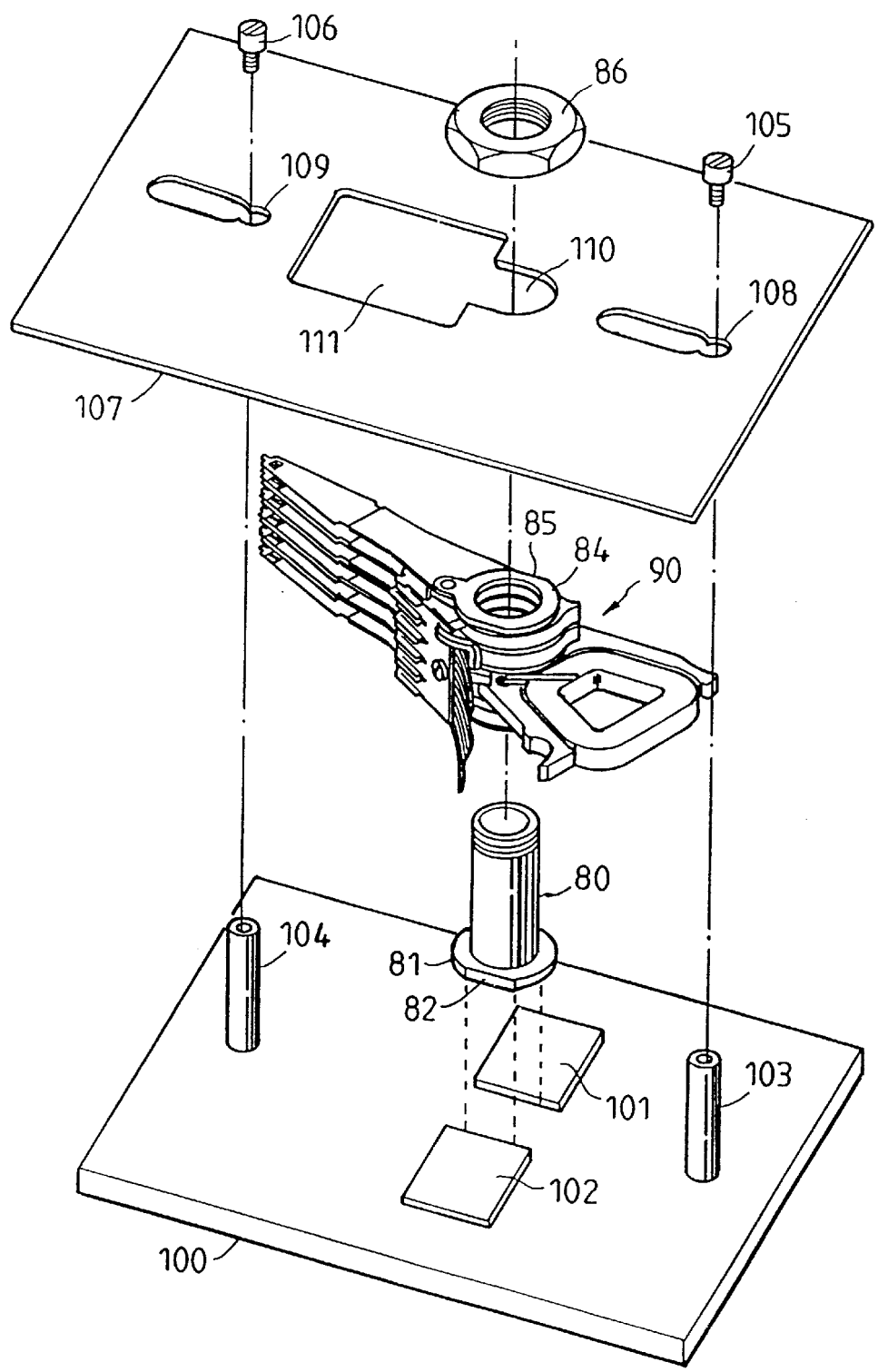

ACTUATOR ARM ASSEMBLY FOR A MAGNETIC STORAGE DEVICE

BACKGROUND OF THE INVENTION

1. Field of Invention

The present invention relates to a method for washing an actuator arm assembly for use with an information recording/reproducing unit such as a magnetic disk storage unit, an actuator arm assembly suitable for the washing method, and an information recording/reproducing unit.

2. Description of the Prior Art

FIG. 1 is a plan view of a conventional magnetic disk storage unit 10. A plurality of magnetic disks 11 are stacked at even spacings, mounted on a rotating shaft 19, and rotated at a fixed rotating speed. The magnetic disks use a front and a back side as recording areas respectively. An actuator arm assembly 21 hereinafter referred to as comb-type actuator arm assembly) includes a comb-type carriage 14 and a head/suspension assembly having a magnetic head 12 attached thereto is mounted so as to face the magnetic disk, and the rear end of the head/suspension assembly 13 is connected to an arm portion of the comb-type carriage 14. In the comb-type carriage 14, a coil support 22 is formed, and a coil 26 is fixed to the inside of it by a bonding agent. A permanent magnet is mounted in a voice coil motor portion 15, and the coil 26 is held in its magnetic field. A lead wire of the coil 26 and the lead wire connected to the magnetic head are connected to a control unit 17 through a flexible cable 16 and a circuit board 20. The control unit 17 feeds a controlled current to the coil 26 to swing the actuator arm assembly about a pivot shaft 18, thereby for positioning the magnetic head at a predetermined track position on the magnetic disk 11 along the direction indicated by arrow A. During the operation of the magnetic disk storage unit, air flow generated on the disk surface by the rotating magnetic disk 11 provides a floating force to the slider, and the head performs a data read/write to the magnetic disk while being spaced apart from the magnetic disk surface by a very small distance. Since the spacing between the head and the magnetic disk is very small, an error occurs in the head operation even if fine particulates stick to the magnetic disk surface. Accordingly, it is needed to maintain the inside of the magnetic disk storage unit in a clean environment, and in the manufacturing stage of the magnetic disk storage unit, the respective components are assembled in a clean room after washed by super-pure water or another solvent.

As one of the sources of particulates produced in the manufacturing stage, there is a soldering process. The flux used in the soldering vaporizes and sticks to the surrounding components. Accordingly, washing the components contaminated by the flux by the soldering is preferred for keeping the environment in the magnetic disk storage unit clean. In particular, this tendency is remarkable in the magnetic disk storage unit having a high recording density. Since a connection of the flexible cable 16 to the lead wire for the head is also provided by solder in the actuator arm assembly, it is preferred to wash the actuator arm assembly wholly after the soldering. However, since the actuator arm assembly includes the pivot 18 as a component and the pivot uses a lubricating oil in its inner bearing, the assembly cannot be immersed wholly in the super-pure water for washing. Accordingly, the washing of the actuator arm assembly needs to be performed after the completion of the soldering and before the mounting of the pivot.

FIG. 2 is a perspective view of the comb-type actuator arm assembly 21 of the magnetic disk storage unit of FIG. 1. A lead wire 31 is drawn out from a head 30, and soldered to the flexible cable 16 at a portion 32 of a connecting board 24. For simplicity, the lead wire 31 for the head is depicted only for the uppermost head/suspension assembly, and a lead wire is actually drawn out from each head in a similar manner. Further, from the beginning and the ending terminal of the coil 26, two lead wires 27 and 28 are drawn out and connected to the flexible cable 16 by solder. The comb-type carriage 14 is usually integrally molded by aluminum die casting. In the actuator arm assembly 21 shown in FIG. 2, when the lead wire 31 for the head and the lead wires 27 and 28 for the coil are connected to the flexible cable by solder on the connecting board, the pivot is not yet mounted into the shaft hole 33 of the comb-type carriage 14. Accordingly, the structure contaminated by flux, shown in FIG. 2, is washed wholly, and thereafter the pivot can be mounted in the clean room.

In recent years, an actuator arm assembly (hereinafter referred to as stacked actuator arm assembly) which does not use the comb-type carriage has been employed. In this actuator arm assembly, a head/suspension assembly is integrally formed from a portion on which a head is to be mounted to a portion to be inserted into a pivot shaft, and they are stacked with spacers sandwiched there between and fixed to the pivot. After the head/suspension assemblies and spacers are fixed to the pivot shaft, the lead wires from the heads and coil are connected to a flexible cable by solder on a connecting board. Accordingly, if the pivot is removed from the stacked head/suspension assemblies and spacers after the soldering, the stacked structure cannot be maintained, so the soldered connection is exposed to stress and may be peeled off. Thus, the pivot cannot be removed after the soldering.

Since the stacked actuator arm assembly needs to maintain the structure integral with the pivot after the soldering is completed on the connecting board, and therefor the assembly cannot be washed, a partial washing around the soldered connection has conventionally been performed so as not to adversely affect the lubricating oil of the pivot. However, it is not ensured that contaminated region due to flux is limited to the partial region partially washed, and thus particulates cannot be fully removed by the partial washing, producing a bottleneck in realizing a high-density magnetic disk storage unit.

Further, in assembling of the stacked actuator arm assembly, the stacked structure is fixed by screwing the pivot with a nut after aligning the head/suspension assemblies and spacers, but the rotational force of the nut screwed by a wrench may be transmitted to the head/suspension assemblies and spacers by friction to bring them out of alignment. If the alignment of the head/suspension assemblies is broken, the effective region dedicated to the disk recording is decreased, and if the alignment of the spacers is broken, the drive performance of the actuator by the VCM is adversely affected.

Accordingly, it is an object of the present invention to provide a method for washing a stacked actuator arm assembly wholly after the completion of the soldering.

It is a further object of the present invention to provide a stacked actuator arm assembly suitable for the above washing, in which the head/suspension assemblies are not put out of alignment when the pivot is mounted thereto.

It is still a further object of the present invention to provide a method for making a stacked actuator arm assembly.

It is still a further object of the present invention to provide an information recording/reproducing unit on which the above stacked actuator arm assembly is mounted, in which the recording area of the disks is not made decrease and the drive performance of the actuator is not reduced.

SUMMARY OF THE INVENTION

The principle of the present invention resides in that, using a stacked actuator arm assembly having a structure enabling the soldering to be completed before mounting a pivot, the assembly is wholly washed after the completion of the soldering. The principle of the present invention also resides in that the pivot and washer are prevented from rotating when the pivot is mounted on the actuator arm assembly.

According to one aspect of the present invention, a first sub-assembly is formed in which alignment and fixing thereof are made without using a pivot, and a flexible cable is connected to the first sub-assembly by solder or the like to form a second sub-assembly. As to the method for fixing the head/suspension assemblies and the spacers which are stacked for forming the first sub-assembly, any method enabling the next soldering process without using the pivot is included in the scope of the present invention, whether it is for temporary fixing only for execution of the present invention or for permanent fixing. The second sub-assembly can be wholly immersed in super-pure water or a solvent for washing even if it is contaminated by the connection of the flexible cable with soldering, because the pivot has not been mounted yet. Since the pivot can be mounted in a clean room after the second sub-assembly is washed, a lubricating oil for the pivot cannot be washed out.

According to another aspect of the present invention, a head portion of the pivot and an outer periphery of the washer have hold portions respectively. To mount the pivot on the stacked head/suspension assemblies and the spacers, a thread portion of the pivot is screwed into a nut by a wrench after inserting the pivot into the stacked structure. If the pivot and the washer are held at the each hold portion so that the head portion of the pivot and the hold portion of the washer do not rotate, the alignment of the head/suspension assemblies and spacers is not broken by the frictional force transmitted from the rotation of the nut. The shapes of the head portion of the pivot and the hold portion of the washer include all the shapes which enable them to be held by pinching them with a wrench or a jig when the nut is screwed.

According to still another aspect of the present invention, an information recording/reproducing unit is provided which is equipped with the stacked actuator arm assembly, in which the alignment of the head/suspension assemblies and the spacers are reliably maintained when the pivot is mounted.

BRIEF DESCRIPTION OF THE DRAWINGS

FIG. 1 is a plan view of the conventional magnetic disk storage unit;

FIG. 2 is a perspective view of the conventional comb-type actuator arm assembly;

FIG. 3 is an assembly drawing of the first sub-assembly of the stacked actuator arm assembly for use with the present invention;

FIG. 4 is a perspective view of the stacked actuator arm assembly for use with the present invention;

FIG. 5 is the pivot and washer of the stacked actuator arm assembly for use with the present invention;

FIG. 6 is another embodiment showing the shape of the hold portions; and

FIG. 7 is a figure showing the method for making the stacked actuator arm assembly of the present invention.

DESCRIPTION OF THE PREFERRED EMBODIMENT

First, description is made to an embodiment related to a method for washing a stacked actuator arm assembly according to the present invention. FIG. 3 is an assembly diagram showing a first sub-assembly before obtaining the stacked actuator arm assembly formed as final structure 50. Ten head/suspension assemblies 51a, 51b, 51c, 51d, 51e, 51f, 51g, 51h, 51i and 51j, four spacers 53a, 53b, 53c, 53d, and one spacer 54 are shown in the order of stacking. Accordingly, this actuator arm assembly corresponds to five magnetic disks. Each head/suspension assembly 51a, 51b, 51c, 51d, 51e, 51f, 51g, 51h, 51i, 51j has a slider 52a, 52b, 52c, 52d, 52e, 52f, 52g, 52h, 52i, 52j mounted on a tip thereof, to which a magnetic head is attached, and its rear end 57 is formed in a shape of a ring so that it can be inserted into a pivot shaft. The head/suspension assemblies consist of an actuator arm, a load beam, and a flexure, which are respectively formed by a thin plate made of stainless steel, and integrally connected to each other by spot welding. A lead wire from the head is formed on the head/suspension assembly 51 as a wiring pattern, and extends to a head terminals 75a, 75b, 75c, 75d, 75e, 75f, 75g, 75h, 75i and 75j. The spacers 53 have the same shape with each other, and their thickness depends on the stack spacing of the magnetic disks. The spacer 54 has the same thickness as the spacers 53 and has a coil support 55, and inside the coil support 55, a coil 56 is fixed by a bonding agent.

The first sub-assembly of FIG. 3 has a bolt 74. The bolt 74 passes through the holes formed in the respective head/suspension assemblies 51 and the respective spacers 53 and 54, and couples with the corresponding thread portion formed in a washer 72, thereby to integrally form the stacked head/suspension assemblies and the spacers. Positions of the holes of the respective head/suspension assemblies 51 and the spacers 54 are determined so that the head/suspension assemblies and the spacer 54 match the position required for the actuator arm assembly formed as the final structure. Since the spacer 53 does not have directivity, the hole position does not have a limitation on alignment as does the spacer 54. Accordingly, the alignment of the respective head/suspension assemblies 51 and the respective spacers 53 and the spacer 54 which are fixed by the bolt 74 can be maintained until the assembly of the magnetic disk storage unit is completed, and the soldering process on the connecting board can be started even before the pivot is mounted thereto.

FIG. 4 is a perspective view for explaining the final structure of the actuator arm assembly obtained by adding additional parts to the first sub-assembly of FIG. 3. The construction of the actuator arm assembly of FIG. 4 can be obtained by adding two processes to the first sub-assembly depicted in FIG. 3.

In the first process, a connecting board 65 having a flexible cable connected thereto is attached to the spacer 54 by a screw 68. Then, each of head terminals 75a, 75b, 75c, 75d, 75e, 75f, 75g, 75h, 75i and 75j is soldered to the flexible cable on the connecting board 65. Since the first sub-assembly is fixed by the bolt 74 after aligned, the soldered connection of the head terminals 75a, 75b, 75c, 75d, 75e, 75f, 75g, 75h, 75i and 75j is not exposed to stress or peeled off. Further, lead wires 62 and 63 from a coil 56 are soldered to the flexible cable 76 on the connecting board 65 to obtain a second sub-assembly. The above shown process to obtain the second subassembly represents one embodiment and it is not intended to be limited to this, but the order of the connections of the head terminals 75a, 75b, 75c, 75d, 75e, 75f, 75g, 75h, 75i and 75j and the lead wires 62 and 63 to the flexible cable 76 may be reversed.

In FIG. 4, since a pivot 71 has not mounted yet on the second sub-assembly, for which the process has been completed to the soldering of the flexible cable 76 to the head terminals 75a, 75b, 75c, 75d, 75e, 75f, 75g, 75h, 75i and 75j and the lead wires 62 and 63, the second sub-assembly can be wholly immersed into super-pure water for washing. The washing of the second sub-assembly by wholly immersing is effective particularly against the contamination from flux, and decreases the possibility that the actuator arm assembly produces particulates within the magnetic disk storage unit.

In the second process, after washing, the second sub-assembly is moved into a clean room, and a nut 73 is used to fix the second sub-assembly with the pivot 71. Although the bolt 74 can be removed after the pivot 71 is mounted, it may be left in the final product of the magnetic disk drive in consideration of the risk of the regeneration of particulates from the thread portion after the removal.

Now, description is made to the embodiments of a stacked actuator arm assembly suitable for the above described washing method, and a method for making the assembly. To mount the pivot 71 on the second sub-assembly described using FIG. 4, it is needed to screw the nut 73 with a wrench for coupling the nut 73 with the thread portion of the pivot 71. By screwing the nut 73 with the wrench to tighten the nut 73, the whole second subassembly can be pinched in the top and bottom portion thereof by the head portion 77 of the pivot 71 and the washer 72 and be fixed. While screwing the nut 73 with the wrench, the head portion 77 of the pivot 71 needs to be fixed by some means to prevent the pivot 71 from rotating in the direction in which the nut 73 rotates, but it is not easy to securely inhibit the rotation since the outer periphery of the head portion 77 is circular. If the head portion 77 is not fully held, the head portion 77 rotates as the nut 73 rotates, transmits its rotational force to the uppermost head/suspension assembly 51 in contact with the head portion 77 by friction, and sequentially transmits the rotational force through the spacers and the head/suspension assembly under it. As a result, the head/suspension assembly 51 and the spacer 54 are put out of alignment. Further, the rotational force is also transmitted to the washer 72 sandwiched between the nut 73 and the head/suspension assemblies, the alignment of the head/suspension assemblies 51 and the spacer 54 is similarly disturbed. The bolt 74 acts to maintain the alignment when the pivot is mounted, but the alignment sometimes cannot be fully maintained if the tightening torque of the nut is large.

FIG. 5 is an embodiment showing the novel structures of a pivot 80 and a washer 84 for use with the stacked actuator arm assembly, which are employed to solve the above problems. In a head portion 81 of the pivot 80 and a washer 84, hold portions 82 and 85 are formed by cutting away part of a periphery shaped in a circle. The hold portions of the pivot 80 and the washer 84 have a structure which enables to be hold easily by a wrench or jig. As another embodiment of hold portions, a shape can be provided in which cutouts are formed in a periphery, as shown in FIG. 6, or a polygon like a bolt nut can also be provided. However, it is preferred that a hold portion is formed by partially providing cutout portions to a typical circular shape of a head portion of a pivot and a washer, because degree of change added to the pivot and the washer production is little.

FIG. 7 is used to describe a method for making the stacked actuator arm assembly in which the pivot and the washer shown in FIG. 5 are used. In FIG. 7, the second sub-assembly 90 depicted in FIG. 4 is reversed with respect to the top and the bottom thereof and mounted on a jig for making the stacked actuator arm assembly. The jig consists of a base 100 and a washer holding board 107. The base 100 comprises a holding portion 101 and 102 formed so as to slightly project from a surface of the base for pinching and holding the hold portions 82 formed in the head portion 81 of the pivot 80, and a support 103 and 104 for supporting the washer holding board 107. In the washer holding board 107, there are provided an opening 110 for pinching and holding the hold portions 85 of the washer 84, and an opening 111 larger than the opening 110. Further, there are provided an opening 108 and 109 for fixing the washer holding board 107 to the support 103 and 104 by a screw 105 and 106.

An embodiment of a procedure for fabricating the stacked actuator arm assembly is described. First, the second sub-assembly 90 is fabricated by the above described procedure. Then, the holding portions 82 of the pivot 80 are interposed between the holding portion 101 and 102 of the base 100 with the downward head portion 81 of the pivot 80. Subsequently, the second sub-assembly 90 is inserted over the pivot 80 upside down. Further, the washer holding board 107 is placed upon the second sub-assembly so that the opening 110 pinches the hold portions 85 of the washer. After the opening 110 pinches the hold portions 85 of the washer, the washer holding board 107 is fixed to the support 103 and 104 by the screw 105 and 106. When the washer holding board 107 is fixed to the support 103 and 104, a surface of the washer 84 is protruded slightly from the surface of the washer holding board 107. Accordingly, when the nut 86 is tightened, the washer holding board is not fixed with the nut 86.

In this state, the nut 86 is placed over the thread portion of the pivot 80, and screwed by a wrench. The pivot 80 is not rotated by the rotational force of the wrench, because the hold portions 82 of the head portion of the pivot are held by the holding portion 101 and 102. The washer 84 does not rotate while the nut 86 is screwed by the wrench, because the hold portions 85 of the washer 84 are held by the opening 110 of the washer holding board 107. Accordingly, the head/suspension assemblies and the spacers are not put out of alignment while the nut 86 is coupled to the pivot 80. After the tightening of the nut is completed, the screw 105 and 106 are loosened, and the washer holding board 107 is rightwardly moved and removed.

The present invention enabled to provide a method for washing the stacked actuator arm assembly after the completion of soldering.

Further, the present invention enabled to provide a stacked actuator arm assembly suitable for the above washing, in which a head/suspension assembly is not put out of alignment when the pivot is mounted thereto.

Furthermore, the present invention enabled to provide a method for fabricating the above actuator arm assembly.

Moreover, the present invention enabled to provide an information recording/reproducing unit on which the above stacked actuator arm assembly is mounted, and in which the recording area of a disk is not decreased and the drive performance of the actuator is not reduced.

What is claimed is:

1. An actuator arm assembly system comprising:
   a plurality of transducer suspensions, each having a suspension alignment aperture and a pivot aperture;

a plurality of spacer members interspersed between the transducer suspensions, each spacer member having a spacer alignment aperture positioned in linear alignment with the suspension alignment apertures, each spacer member having a pivot aperture;

a washer having a hold portion on an outer periphery thereof, the washer having a washer alignment aperture positioned in linear alignment with the suspension alignment apertures and the spacer alignment apertures, the washer having a pivot aperture;

a pivot provided with a head portion at one end thereof, the head portion having a hold portion on an outer periphery and a thread portion at the other end thereof, said pivot passing through the pivot apertures of the suspensions and spacer members, the washer being located at the opposite end of the pivot from the pivot head;

a nut placed upon the washer for coupling with the threaded portion of the pivot; and the alignment apertures being sized to receive an alignment pin, the alignment pin is a bolt, and the alignment aperture of the washer is threaded to receive the bolt.

2. The system of claim 1, wherein the outer periphery of the head portion of said pivot and the outer portion of said washer are substantially circular, and cutout portions are provided with the outer periphery of the head portion and said outer periphery of said washer to form the hold portions respectively.

\* \* \* \* \*